United States Patent Office 2,817,645
Patented Dec. 24, 1957

2,817,645

REACTION OF POLYVINYLPHTHALIMIDES AND ALKYLENE POLYAMINES AND PRODUCTS THEREOF

Cyrus A. Weisgerber, Chadds Ford, Pa., assignor to Hercules Powder Company, Wilmington, Del., a corporation of Delaware No Drawing. Application June 30, 1954
Serial No. 440,539

11 Claims. (Cl. 260—78)

This invention relates to new synthetic resins and more particularly to the resins formed by the reaction of a polymer of an N-vinylimide of a dicarboxylic acid with an alkylene polyamine.

I have found that valuable products are obtained by causing polymeric imides of dicarboxylic acids to react with alkylene polyamines. The reaction proceeds at anywhere from about 100° C. to about 300° C., and it is preferred to carry out the reaction at the reflux temperature of the system. The reaction may be carried out either under anhydrous conditions or in the presence of water.

The term "alkylene polyamine" is used herein to include not only simple compounds, such as ethylenediamine, 1,3-propylene-diamine, etc., but also polyalkylene polyamines such as diethylene triamine, triethylene tetramine, tetraethylene pentamine, etc. In general, the alkylene polyamines which are operable in accordance with this invention are those which conform to the following general formula:

$$NH_2(C_nH_{2n}HN)_xH$$

where $n$ is at least 2, preferably from 2 to 6, inclusive, and $x$ is at least one, preferably from 1 to 5, inclusive.

Any polymer of an N-vinylimide of an organic dicarboxylic acid including the N-vinylimides of aliphatic, aromatic and heterocyclic dicarboxylic acids may be used. Thus, there may be used the polymers prepared from N-vinylphthalimide, N-vinylsuccinimide, N-vinyl-3-nitrophthalimide, N-vinyl-4-bromophthalimide, N-vinyltetrachlorophthalimide, N-vinyltetrahydrophthalimide, N-vinylphenylsuccinimide, N-vinylbutylsuccinimide, N-vinyl-β-methylglutarimide, N-vinyldiglycolylimide, N-vinyltetramethyl-succinimide, N-vinylthiodiglycolylimide, N-vinylglutarimide, N-vinyltetrahydrophthalimide, etc. Any method of polymerizing these materials known to those skilled in the art may be used. Thus, any of the processes set forth in U. S. 2,276,840 or U. S. 2,231,905 may be used.

The reaction products of this invention retain the polyvinyl chain structure of the polymers from which they were derived. Moreover, the polyvinyl chains of the reaction products contain recurring primary amino groups, acylimido groups and substituted acylamido groups having the following formula:

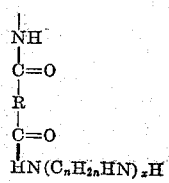

where R is a bivalent radical, aliphatic or aromatic, and $n$ is 2 or more and $x$ is one or more. The acylimido groups present are those acylimido groups of the original polymer which have not undergone any reaction. These acylimido groups are those having the following formula:

where R has the same meaning as above indicated.

The reaction products of this invention prepared in the presence of water contain, in addition to the above-named groups, recurring acylamido groups having the following formula attached directly to the polyvinyl chains:

where R has the same meaning as above indicated. In view of the fact that these reaction products contain both carboxyl groups and amino groups, they are amphoteric in character.

The products of this invention are particularly adapted as additives to improve the wet strength of paper. In practicing this process the resin is added to an aqueous suspension of the paper stock in the process known in the art and in the instant application as beater addition. In this process the resin is added to the paper system at that point which is most convenient to the actual manufacturing needs, such as, for example, to the paper furnish, at any point prior to sheet formation, such as addition at the head box, fan pump, beater engine, Jordan, or the like. Ordinarily, about 0.25% to about 5% of the resin solids, based on the bone dry weight of the pulp, may be used. The pH of the pulp slurry may vary over a wide range, being anywhere from about 4.5 to about 9. The pulp is then made into a sheet or board and dried in the usual manner. No separate curing step is necessary. The resulting paper or board is characterized by having unusually high wet strength compared to an untreated paper or board.

The resins of this invention may be used in conjunction with conventional papermaking ingredients, such as, for example, sizing agents, fillers, dyes, pigments, and the like, to provide, in all cases, a paper product having the desired high wet strength properties. Among the peculiar advantages of these resins in promoting high wet strength in paper are, first, that they impart a high degree of wet strength at a very low resin concentration; secondly, that there is no need for a separate curing step using these resins; and finally, the resin may be used over a wide pH range and, in particular, at approximately neutral pH's, it having long been known that the high acid pH's needed for the proper curing of the wet strength resins of the prior art were detrimental both to the wet and dry strength of the resulting sheet or board.

The products of this invention are highly useful as coagulating agents. They cause extremely rapid precipitation of the solid substances carried in a liquid medium in finely divided form. Moreover, the material which is carried down is not contaminated by the resins of the instant invention as they are not coprecipitated and are normally used in very low concentrations. Furthermore, the floc is obtained in compact particles which are more easily filter-pressed and handled than would be the case with flocs contaminated with the gelatinuous and slimy precipitates largely used in the prior art. In utilizing these resins as coagulants, it is desirable to first dissolve the resin or a suitable salt thereof in water and then add the desired amount of the solution to the material to be treated. The treated material is then agitated for a short time to completely distribute the flocculating agent throughout. The floc is then allowed to settle out of the suspension and may be removed from the liquid by any of the means known to the art such as filtration, centrifugation, decanting the supernatant layer, drawing off the bottom layer, etc. The method of addition of the resin is not critical. It may also be added in the solid form as well as in the form of an aqueous or other solution.

The mixing conditions are not so severely limited when the resins of the instant invention are used as when alum and the like are employed. It is, of course, advantageous to provide for uniform distribution of the compound in the water in order that minimum amounts may be effective. The process may be carried out batchwise or intermittently as well as continuously, and ordinary or elevated temperature treatment may be used. The pH of the liquid medium may be either acidic or basic, although extreme pH's on either side should be avoided for maximum effectiveness. The resins may be used alone or in conjunction with the addition of other suitable water-treating agents such as alum. These products may be used advantageously to remove harmful impurities from water as in clarifying waste water from paper mills, sewage, industrial wastes, suspensions from ore recovery processes, etc. In addition, due to their effectiveness at such low concentrations and lack of contamination of the flocculated material, they are also highly useful in processes designed to recover the flocculated material as a useful product, as in the treatment of the serum portion resulting from the coagulating of latex, the treatment of pigment suspension, as with umber, the treatment of coal slurries from coal washing operations, etc.

The following examples are set forth by way of illustration and not in limitation of the invention. All parts and percentages are by weight unless otherwise specified.

EXAMPLE 1

Into a glass reaction vessel fitted with a reflux condenser, a stirrer and a heating mantle were placed 300 parts of water, 150 parts of a 73.6% solution of ethylenediamine in water and 62.6 parts of finely divided polyvinylphthalimide. The mixture was heated at reflux with agitation for about 6 hours. At the end of this time all the polymer had dissolved to produce a clear light yellow solution. The solution was allowed to cool. The cold polymer solution was poured into 4,350 parts of acetone and the solid which precipitated out was repeatedly washed with acetone in a Waring Blendor. The material was then filtered and dried. There was obtained 73.3 parts of dried polymer. The polymer so obtained was completely soluble in water and showed on analysis by the Kjeldahl method 14.4% of nitrogen and by the Van Slyke method 9.77% nitrogen. This indicated that approximately 67% of the nitrogen present was in the form of primary amino groups. A 10% aqueous solution of the material thus prepared was treated in the following manner: The pH was raised by a 5% sodium hydroxide solution from 8.5 to 11.7 without precipitation occurring. Another portion of a 10% aqueous solution of the polymer so prepared was treated with 5% HCl solution to lower the pH from 8.5 to 3.95 without precipitation occurring. The amphoteric nature of the polymer indicates the presence of both carboxylic and amino groups in the polymer.

EXAMPLE 2

Into a glass reaction vessel fitted with a reflux condenser, a stirrer and a heating mantle were placed 300 parts of water, 150 parts of ethylenediamine and 70 parts of finely divided polyvinylphthalimide. The mixture was heated at reflux with agitation for about 5.5 hours. The reaction product, a viscous yellow solution, was filtered into 2,750 parts of isopropyl alcohol. The white, gummy precipitate was washed repeatedly with isopropyl alcohol and twice with acetone in a Waring Blendor. After drying overnight in a vacuum desiccator, there were obtained 16.8 parts of a fine, white powder.

The polymer so obtained was completely soluble in water and showed on analysis by the Kjeldahl method 15.9% of nitrogen and by the Van Slyke method 9.29% nitrogen. This indicated that approximately 58% of the nitrogen present was in the form of primary amino nitrogen.

EXAMPLE 3

Into a glass reaction vessel fitted with a reflux condenser, a stirrer and a heating mantle were placed 100 parts of water, 50 parts of triethylenetetramine and 20 parts of finely divided polyvinylphthalimide. The mixture was refluxed for half an hour and then another 50 parts of triethylenetetramine were added and the refluxing continued for 3 hours. The product was a clear, orange solution which gelled on cooling. The gel redissolved on but slight warming and the solution was poured into 1600 parts of acetone. The solid which precipitated out was repeatedly washed with acetone in a Waring Blendor and was dried overnight in a vacuum oven at 70° C. to give 23.3 parts of dry polymer which was readily soluble on heating in 20% hydrochloric acid.

EXAMPLE 4

Into a glass reaction vessel fitted with a reflux condenser, a stirrer and heating device were placed 67 parts of polyvinylphthalimide and 270 parts of anhydrous ethylenediamine. The mixture was heated at 50° C. for 3 hours. The temperature was then raised to 94° C. for 3¾ hours. A clear solution was obtained which was poured into a large volume of acetone and a solid precipitated out. This product was purified by reprecipitation. The precipitate so obtained was dried at room temperature in a vacuum desiccator. This product was readily soluble in water and had the following analysis:

Chlorine _____ 17.5
Total nitrogen_____ 12.1
Van Slyke nitrogen_____ 11.9

There appears to be no cross-linking between the polymer chains as evidenced by the water solubility of the products despite the use of polyfunctional reactants. These products may be used in a variety of applications. Thus, the novel products prepared in accordance with the instant invention improve the wet tensile strength of paper, are valuable flocculating agents and may be used as shrinkage control resins for wool, as is shown in the following examples. (All parts and percentages are by weight unless otherwise specified.)

EXAMPLE 5

A reaction product of polyvinylphthalimide and ethylenediamine was prepared as in Example 2. A 1% solution of this reaction product was made up. A lightly beaten bleached sulfite pulp was diluted to 0.025% consistency on a Noble and Wood handsheet machine. To this was then added enough of the resin solution to give 1% of the resin based on the bone dry weight of the pulp. The pulp was adjusted to a pH of 6.0 with 10% HCl, made into handsheets with a basis weight of 40 lb. per ream, and dried on a steam roll.

No separate curing step was necessary, the paper having a wet tensile strength of 5.0 lb. per inch as it came off the machine compared to a wet tensile strength of 0.10 lb. per inch for a control sheet prepared under identical conditions but without the addition of any resin. The wet tensile strengths were determined by soaking one-inch samples of the paper in distilled water for 24 hours and then running the test on a Scott IP-4 tensile tester.

EXAMPLE 6

A reaction product of polyvinyl phthalimide and ethylenediamine was prepared as in Example 2. Wool swatches were padded with a 4% aqueous solution of the reaction product. The swatches were then padded with a 0.8% solution of formaldehyde, dried for 20 minutes at 200° F. and cured for 10 minutes at 300° F. Two sets of control swatches were prepared, one being padded with distilled water and the other with a 3.6% formaldehyde solution. Drying and curing procedures were identical with those used on the resin-padded swatches supra. The results are set forth in the following table:

*Table 1*

| Treatment | Hand | Cure | Coloration | Percent Dry Add-On | Shrinkage¹ (Percent) | |
|---|---|---|---|---|---|---|
| | | | | | Warp | Fill |
| Water | Soft | 20 min. at 250° F | None | 0.0 | 6.7 | 4.6 |
| 3.6% Formaldehyde | do | do | do | 4.0 | 6.0 | 4.0 |
| Polyvinylphthalimide - ethylenediamine followed by HCHO. | do | 10 min. at 300° F | do | 11.2 | 1.0 | 0.0 |

¹ After three washes at 100° F. with a neutral built detergent.

EXAMPLES 7 THROUGH 10

A reaction product of polyvinylphthalimide and ethylenediamine was prepared as in Example 2. A 0.1% aqueous solution of the resin was made up. In these examples bentonite was suspended in tap water. No attempt was made to adjust the pH of the suspension. The pH was determined for each suspension prior to adding the flocculating agent. The procedure of the examples was to add the alum, followed in Example 10 by enough of the resin solution to give the indicated concentration. The suspension was then agitated at 100 R. P. M. for 1 minute followed by agitation at 40 R. P. M. for 15 minutes. After this time the agitation was discontinued and the settling of the floc was observed. The following table sets forth the results.

*Table II*

| Example | Additive | P. p. m. | Floc Formation | Percent Settled | | pH |
|---|---|---|---|---|---|---|
| | | | | 5 min. | 15 min. | |
| 7 | Alum | 10 | No floc | No floc | No floc | 7.6 |
| 8 | do | 15 | do | do | do | 7.6 |
| 9 | do | 20 | do | do | do | 7.6 |
| 10 | 30 p. p. m. alum plus reaction product of polyvinylphthalimide and ethylenediamine. | 2.0 | Very fast, very large. | 95 | 98 | 7.7 |

EXAMPLE 11

A reaction product of polyvinylphthalimide and ethylenediamine was prepared as in Example 2. A 1% aqueous solution of the resin was made up. A latex serum was obtained from the B. F. Goodrich Company, Port Neches, Texas. This serum was obtained from coagulating a rubber latex with salt and acid. The serum contained a small amount of rubber. On analysis it was found that the serum contained 0.0927 part of dry rubber per 100 parts of serum. To 100 parts of the serum was added enough of the resin solution to give 10 parts of resin per million parts of serum. The solution was then agitated and the agitation was stopped and the rubber allowed to coagulate. The serum was then filtered and the rubber obtained dried. In all, there was obtained 0.05 part of dry rubber. Thus, better than 50% of the rubber in the serum was obtained by this treatment.

EXAMPLE 12

A reaction product of polyvinylphthalimide and ethylenediamine was prepared as in Example 2. A 1% aqueous solution of the resin was made up. A sample of paper mill white water was obtained from the Curtis Paper Company, Newark, Delaware. The white water contained paper fiber, clay filler and alum. The pH of the suspension was 4.35. To the white water was added enough of the resin solution to give 2 p. p. m. of the resin. This sample and a control sample were stirred at 85–100 R. P. M. for 1 minute and at about 20 R. P. M. for 4 minutes. Agitation was stopped, and in 1 minute about 95% of the solid had separated in the treated sample, while in the untreated control sample about 25% of the solids had separated.

The reaction products may also be used for such other uses as sizing cotton fabrics.

I claim:

1. A process for preparing water-soluble reaction products which comprises reacting a polymer of an N-vinylimide of a dicarboxylic acid in contact with an alkylene polyamine at about 100° C. to about 300° C.

2. A process for preparing water-soluble reaction products which comprises reacting a polymer of an N-vinylimide of a dicarboxylic acid and an alkylene polyamine in the presence of water at about 100° C. to about 300° C.

3. A process according to claim 2 wherein the N-vinylimide is N-vinylsuccinimide.

4. A process according to claim 2 wherein the N-vinylimide is N-vinylphthalimide.

5. A process according to claim 4 wherein the alkylene polyamine is ethylenediamine.

6. A process according to claim 4 wherein the alkylene polyamine is triethylene tetramine.

7. The product produced by the process of claim 2.

8. The product produced by the process of claim 4.

9. The product produced by the process of claim 5.

10. The product produced by the process of claim 6.

11. The product produced by the process of claim 1.

References Cited in the file of this patent

UNITED STATES PATENTS 2,566,250    Reynolds et al. _____ Aug. 28, 1951